United States Patent [19]

Smith

[11] Patent Number: 5,393,365
[45] Date of Patent: Feb. 28, 1995

[54] EMBOSSED GLASS/PLASTIC LAMINATE AND PROCESS FOR PREPARING THE SAME

[75] Inventor: Charles A. Smith, Vienna, W. Va.

[73] Assignee: E. I. du Pont de Nemours and Company, Wilmington, Del.

[21] Appl. No.: 155,349

[22] Filed: Nov. 19, 1993

[51] Int. Cl.⁶ .............................................. B32B 17/00
[52] U.S. Cl. ...................................... 156/219; 156/99; 156/100; 156/102; 156/278; 156/323; 264/293
[58] Field of Search .................. 156/99, 100, 102, 219, 156/278, 323; 264/293

[56] References Cited

U.S. PATENT DOCUMENTS

| | | | |
|---|---|---|---|
| 3,443,950 | 5/1969 | Rawlins | 96/87 |
| 3,960,627 | 6/1976 | Halberschmidt et al. | 156/104 |
| 4,072,779 | 2/1978 | Knox | 264/290.2 |
| 4,177,315 | 12/1979 | Ubersax | 428/336 |
| 4,292,372 | 9/1981 | Moynihan | 428/437 |
| 4,297,262 | 10/1981 | Phillips | 524/308 |
| 4,469,743 | 9/1984 | Hiss | 428/215 |
| 5,069,942 | 12/1991 | Anderson | 427/387 |

Primary Examiner—D. S. Nakarani
Attorney, Agent, or Firm—Patricia McGee

[57] ABSTRACT

A decorative relief pattern is provided on a glass/plastic laminate wherein a sandwiched structure comprised of a glass sheet (10), an adhesive layer (12), a plastic film (14) having a thin cured coating of a polysiloxane anti-abrasion material (16) on its exposed surface by placing a texturing medium (18) on the exposed surface and autoclaving the sandwiched structure under vacuum and pressure to provide a permanent bond between the plastic film (14) and the glass sheet (10) thereby transferring the surface texture of the texturing medium (18) to the exposed surface of said coating.

3 Claims, 1 Drawing Sheet

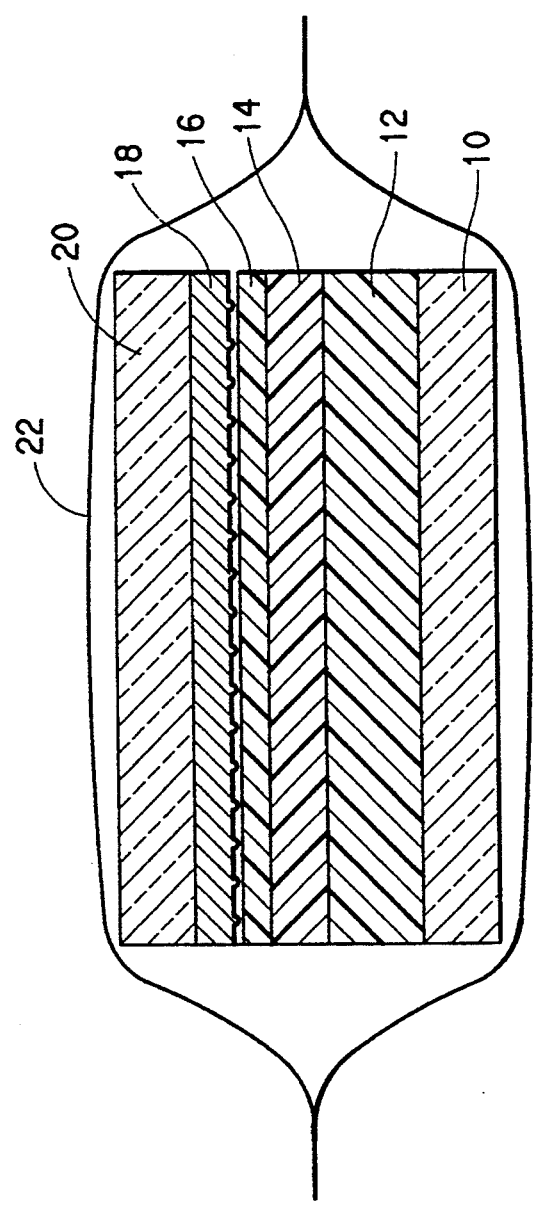

EMBOSSED GLASS/PLASTIC LAMINATE AND PROCESS FOR PREPARING THE SAME

FIELD OF THE INVENTION

The present invention relates to providing glass/plastic laminates with a decorative surface pattern.

BACKGROUND OF THE INVENTION

Various processes are known for imparting optical effects to glass/plastic laminates which are useful in safety glass applications. One of the most used process employs engraved metal impression rollers for embossing the surface of the glass. Such rollers are expensive to manufacture and limit the number of available patterns. Only repeating patterns are possible with the pattern resolution being limited by the viscosity of the softened glass as it passes through the nip point of the impression rollers. The pattern may weaken the glass structurally and make it difficult to cut or laminate.

In other processes the plastic material is embossed by machined or otherwise textured transfer rollers. A high degree of pattern detail is generally not obtainable by this process, and only repetitive patterns are possible.

In another process surface relief is obtained through injection molding. Expensive molds are utilized in a system for reacting or heating the plastic material and then forcing the material into the mold using high pressure.

What is needed is a simplified inexpensive process for embossing or patterning glass/plastic laminates which is adaptable to providing almost a limitless number of different patterns.

SUMMARY OF THE INVENTION

I have discovered that a decorative relief pattern can be obtained on a glass/plastic laminate by placing a texturing medium on the surface of a cured polysiloxane coating which has been applied to the surface of a plastic film which is adhesively secured to a sheet of glass. The composite is autoclaved under vacuum and pressure to transfer the pattern to the coated surface of the laminate. The texturing medium may be selected from readily available materials such as paper, metal mesh, cloth fabric, leaves or other natural materials which can be readily removed from the surface of the laminate after removal from the autoclave leaving behind a detailed pattern on the coated surface. Unlike other texture transferring methods, the texturing medium is independent of an embossing roller, die or cover plate.

It is essential that the plastic film be coated with a polysiloxane abrasion resistant coating and that the coating be cured prior to autoclaving. This is indeed surprising in view of the fact that polysiloxane coatings are conventionally used to protect a plastic surface from abrasions and prevent distortions in the surface.

Mold releases commonly utilized for injection molding are not necessary since the polysiloxane coating acts as a tack-free surface for embossing. The process is non-destructive and in most cases the texturing medium may be used to prepare additional decorated laminates.

BRIEF DESCRIPTION OF THE DRAWINGS

The FIGURE shows a schematic lay-up (sandwich) of components for producing the products of this invention.

Referring to the FIGURE the laminate components consist of a glass sheet 10. An adhesive sheeting 12 such as plasticized polyvinyl butyral which is placed on glass sheet 10. A plastic film 14 such as a polyester film which has a cured coating 16 of an abrasion resistant polysiloxane is placed in contact with adhesive sheeting 12 with the coated side up. Texturing medium 18 is placed in contact with coating 16. Coverplate 20 covers the texturing medium. The sandwiched components are placed in a vacuum bag 22. Vacuum bagging the components removes excessive air and permits the adhesive layer to bond the glass substrate to provide a bubble-free lamination when pressure is applied to coverplate 20.

DETAILED DESCRIPTION OF THE INVENTION

The glass, adhesive, plastic film and polysiloxane coating material useful in this invention are all known materials. The glass may be tempered or untempered, shaped or flat glass with a thickness selected for the particular intended end use. The adhesive is preferably plasticized polyvinyl butyral such as that described in Phillips U.S. Pat. No. 4,297,262. The adhesive may contain an adhesion promoter of the type described in Moynihan U.S. Pat. No. 4,292,372. The polyvinyl butyral adhesive will usually have a thickness from 10 to 60 mils (0.25 to 2.3 mm). Various grades and thicknesses are sold by E. I. du Pont de Nemours and Co. under the trademark Butacite ®. Other adhesive sheeting materials such as polyurethanes and the like may be substituted for the polyvinyl butyral film.

The plastic film is preferably a polyester film having a thickness from 2 to 14 mils (50.8 to 355.6 micrometers). Polyethylene terephthalate film which has been biaxially oriented as disclosed in Knox U.S. Pat. No. 4,072,779 is particularly preferred. Other polymeric films may be selected from known materials such as polyesters, polyurethanes, polyvinylidene chloride, ionomeric polymers, cellulose esters as well as thin sheets prepared from methylmethacrylate polymers and polycarbonates. The thickness will vary depending on the particular application for the laminate.

The polysiloxane abrasion resistant coating compositions are those used where a durable, abrasion-resistant surface is desired. Suitable coating compositions are disclosed in Ubersax U.S. Pat. No. 4,177,315, Kwiatkowski Canadian Pat No. 1,215,627 and Hiss U.S. Pat. No. 4,469,743. The coatings can be applied by using conventional coating procedures. The coatings are generally applied in a thickness of about 1 to 20 microns, and particularly from 1 to 10 microns. The compositions disclosed in the Ubersax patent are those comprising from about 5 to 50 weight percent solids, the solids comprising from about 10 to 70 weight percent silica and from about 90 to 30 weight percent of a partially polymerized organic silanol of the general formula $RSi(OH)_3$, wherein R is selected from methyl and up to about 40% of a radical selected from the group consisting of vinyl, phenyl, $\gamma$-glycidoxypropyl, and $\gamma$-methacryloxypropyl, and from about 95 to 50 weight percent solvent, the solvent comprising from about 10 to 90 weight percent water and from about 90 to 10 weight percent lower aliphatic alcohol. The coating composition has a pH of from about 6.2 to 6.5.

Prior to applying the abrasion resistant coating to the substrate, it may be desirable to pretreat the substrate to promote adhesion of the coating. Various adhesion promoting techniques known to those skilled in the art can be used, such as flame treating, corona discharge and resin coating. The primary techniques described in U.S. Pat. No. 3,443,950 have been found particularly convenient.

The coating composition, after application to the substrate, can be cured at a temperature of from 20° to 150° C. For convenience in commercial operations, a curing temperature of about 100° C. is preferred, at which cure times of about one minute are realized.

Autoclaving under pressure is generally carried out at temperatures from about 100° to 170° C. and pressures from 2 to 30 atmospheres (0.203 to 3.04 mpa) depending on the materials being used.

The finished glass/plastic laminate has a permanent embossed texture with remarkable detail. With subtle relief, only the plastic layer is embossed, but with deeper relief, texturing extends into the plastic layer and the adhesive sheeting. In most cases the texturing medium may be used to produce another embossed specimen.

The following example further illustrates this invention.

EXAMPLE

A polysiloxane coating having a thickness of 2 microns is applied to a 0.178 mm polyethylene terephthalate film surface and cured at a temperature of about 100° C. for 1 minute. A composite film is prepared by laminating a 0.762 mm polyvinyl butyral film to the polyethylene terephthalate film. Lamination is effected by passing the polyvinyl butyral film and coated polyethylene terephthalate film through nip rolls, one of which is heated to about 150° C. with the polyethylene terephthalate film being adjacent the hot roll.

A 30.48 cm square of the composite film is placed with the polyvinyl butyral side facing down on a substrate of glass 0.318 cm thick. A sheet of chart paper having a matt finish is positioned on the exposed surface of the composite and a flat glass cover plate is placed over the assembly. The assembly is then placed in a nylon vacuum bag, and after the bag is evacuated, the bag and assembly are placed in an autoclave. The unit is heated at a temperature of about 135° C. for 30 minutes at a pressure of 1.55 mpa.

The temperature and pressure is then ramped down to permit removal and handling of the assembly. The bag, cover plate and chart paper are removed, and the resulting glass/plastic laminate is inspected. The surface relief of the chart paper is replicated in detail on the surface of the composite the fibers of the paper and overall roughness is replicated.

The ultimate products of this invention will find utility in the automobile industry, in the transportation industry in general, in the building industry and in interior decorating, in the furniture industry, in various forms of illumination, in making aquariums, mirrors, shower doors, and in any situation where such decorated glass might be desired.

What is claimed is:

1. A process for producing a glass/plastic laminate having a decorative textured pattern thereon wherein a sandwiched structure is formed from
   a) a glass sheet (10), and
   b) a plastic laminate comprising a plastic film (14) sandwiched between an adhesive layer (12) and a cured coating of a polysiloxane anti abrasion material (16) in which said adhesive layer is adhered to said glass sheet and said antiabrasion material has one surface adhered to said plastic film and the other surface exposed, characterized by bonding said glass sheet to said adhesive layer and transferring the surface texture of a texturing medium (18) to the exposed surface of said coating by placing said texturing medium on the surface of said coating and applying heat and pressure to said sandwiched structure, and thereafter removing the texturing medium.

2. The process of claim 1 wherein said adhesive layer is plasticized polyvinyl butyral and said plastic film is polyethylene terephthalate.

3. The process of claim 2 wherein said adhesive layer has a thickness from 10 to 90 mils (0.25 to 2.3 ram), said plastic film has a thickness from 2 to 14 mils (50.8 to 355.6 microns) and said coating has a thickness from 1 to 20 microns.

* * * * *